United States Patent [19]
Stephens

[11] 3,935,562
[45] Jan. 27, 1976

[54] PATTERN RECOGNITION METHOD AND APPARATUS

[76] Inventor: Richard G. Stephens, 318 Security Mutual Life Bldg., Binghamton, N.Y. 13901

[22] Filed: Feb. 22, 1974

[21] Appl. No.: 444,951

[52] U.S. Cl. .............. 340/146.3 AG; 340/146.3 D; 235/92 PC
[51] Int. Cl.² .................................... G06K 9/12
[58] Field of Search ............. 340/146.3 Y, 146.3 D, 146.3 AG, 340/146.3 R; 235/92 PC, 92 EV, 92 AE, 92 CP; 178/7.6; 324/71 CP; 356/71, 103, 104

[56] References Cited
UNITED STATES PATENTS

| | | |
|---|---|---|
| 3,686,486 | 8/1972 | Coulter et al. .............. 235/92 CP |
| 3,790,760 | 2/1974 | Stiller ..................... 235/92 PC |
| 3,803,553 | 4/1974 | Nakano et al. ............ 340/146.3 D |

Primary Examiner—Joseph M. Thesz, Jr.

[57] ABSTRACT

Method and apparatus for pattern recognition, and especially biological sample analysis, by optical scanning of a pattern to derive a waveform which is processed to provide data values defining the scanned pattern in terms of functions of the frequency of occurrence of elemental areas having various optical remissivities (transparencies or reflectances). Devices for deriving and recording data values in both digital and analog form are disclosed.

13 Claims, 10 Drawing Figures

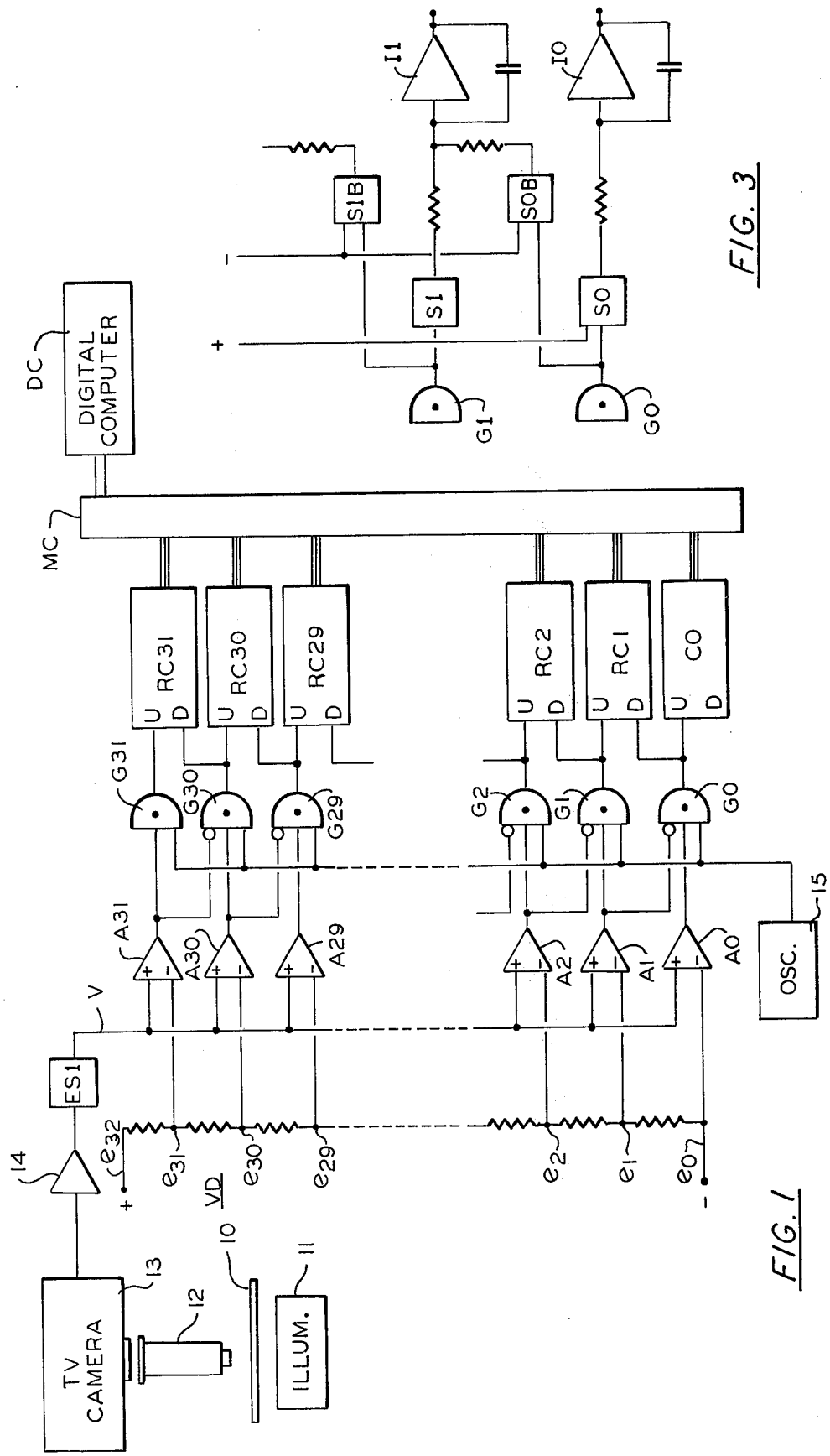

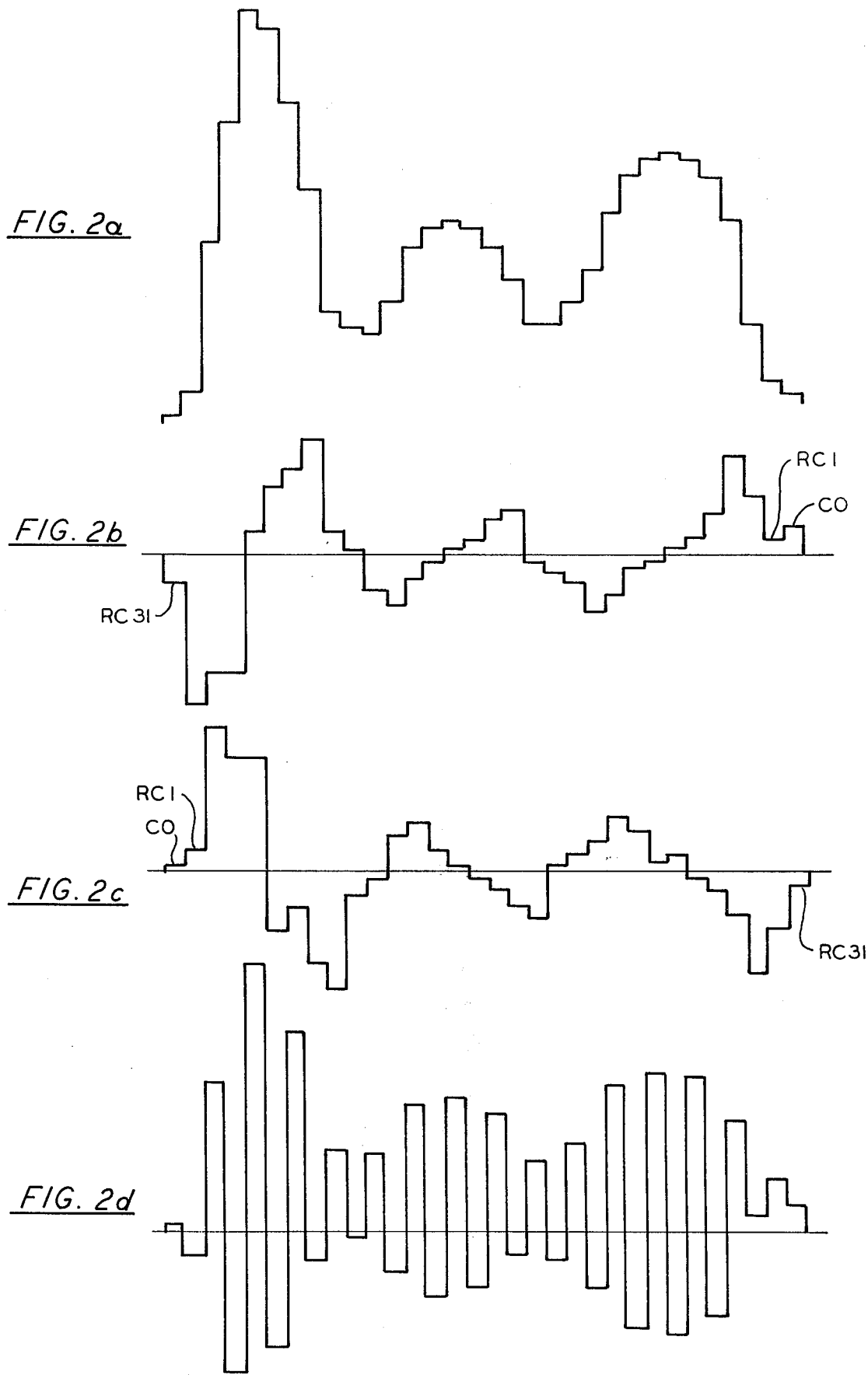

PATTERN RECOGNITION METHOD AND APPARATUS

My invention relates to pattern recognition method and apparatus, and in some respects is an improvement of the method and apparatus shown in U.S. Pat. No. 3,705,383 issued Dec. 5, 1972 to William W. Frayer, the disclosure of which should be referred to for background useful for a fuller understanding of the present invention. The disclosed Frayer invention contemplates deriving a group of data values characteristic of a pattern (e.g. a leukocyte or other biological sample) by optically scanning the pattern to derive a waveform which varies in accordance with the light remissivity (transparence or reflectance) of the elemental area of the pattern being scanned at a given instant, and routing signals to different accumulator devices while the amplitude of the waveform lies within respective amplitude ranges, thereby to provide a group of data values comprising points on a histogram characteristic of the scanned pattern. Each data value represents the total area within the scanning field having a light-remissivity falling within a given range of light-remissivities.

The present invention also contemplates optically scanning a pattern to derive a waveform which varies in accordance with the light remissivity of the elemental area of the pattern being scanned at a given instant, and also contemplates routing signals to different accumulator devices eventually to provide a set of data values characteristic of the scanned pattern, but the manner in which the signals are stored in the accumulators, and the nature of the eventual output data values, differ from the techniques disclosed by Frayer. In the present invention one or several of the data values may, like the prior system, represent the total area within the scanning field falling within a given range of light-remissivities, but the other data values preferably represent functions of combinations of the areas within the field falling within plural ranges of light remissivities, such as, for example, the difference between the area of the field falling within a first range and the area falling within a second range.

A principal use of such pattern analysis methods and apparatus is to provide data values which may be processed in a variety of ways to identify, classify, or otherwise analyze a given pattern, and in most applications the data values provided may best be processed by a digital computer. While the methods and apparatus disclosed in the mentioned prior art patent contemplate the accumulation of count values each representing the area of the scanned pattern which has a particular light remissivity, it is important to note in connection with the present invention that computer analysis leading to the same conclusions as those contemplated by Frayer may be accomplished using other count values. For example, rather than deriving count values each representing the pattern area having a given light remissivity in absolute terms, one may characterize the scanned pattern by deriving count values which represent areas of given light remissivity in relative or incremental terms. While the Frayer method contemplates a separate accumulation of pulse counts for each respective range of light remissive levels, the present invention, on the other hand, contemplates the accumulation of pulse counts resulting from the scanning of plural or combined different ranges of light-remissive levels. From the data values thus provided by the method and apparatus of the present invention, the computer can readily provide the same data values as those provided by the Frayer method should any of those data values be desired, and, indeed, the present invention initially provides certain useful data values which can be obtained only after further computer processing of the data values provided using the Frayer method. Thus it is a primary object of the present invention to provide improved pattern analysis method and apparatus wherein signals representing combinations of scanned pattern areas falling into different ranges of light remissivity are accumulated to provide sets of data values characteristic of the scanned pattern.

As in the prior system, the signals may be accumulated in digital form, using a bank of digital counters or time-sharing one or a few digital counters, or may be accumulated in analog form, using a bank of analog integrators or time-sharing one or a few analog integrators. Use of the technique of the present invention allows one to utilize accumulator means having lesser capacity, such as digital counters having fewer counting stages, and thus leads to equipment savings. Thus another object of the present invention is to provide pattern analysis method and apparatus which provides data representing the frequency of occurrence of elemental areas falling within given ranges of light-remissivity using less equipment.

In some applications it is desirable that the data values be provided at one location using a device which scans the pattern and accumulates data values in pulse counters, such as conventional binary pulse counters, and that such data then be transmitted to a remote location for further analysis. A plurality of scanner-accumulator devices may be arranged to transmit data values to a central processing means such as a digital computer, over telephone lines, for example. Use of the method and apparatus of the present invention, wherein data is provided in incremental terms, results in smaller numerical values, which may be transmitted with less equipment and/or in less time.

Other objects of the invention will in part be obvious and will in part appear hereinafter.

The invention accordingly comprises the several steps and the relation of one or more of such steps with respect to each of the others, and the apparatus embodying the features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 1 is a schematic diagram illustrating portions of one form of scanning and accumulating device constructed in accordance with the present invention.

FIGS. 2a to 2d are histograms useful in understanding the nature of the data values provided by the system of the prior art and various forms of the present invention.

FIG. 3 is a schematic diagram illustrating the nature of modifications which may be made to the apparatus of FIG. 1 to provide data values in analog form.

Figure 4:
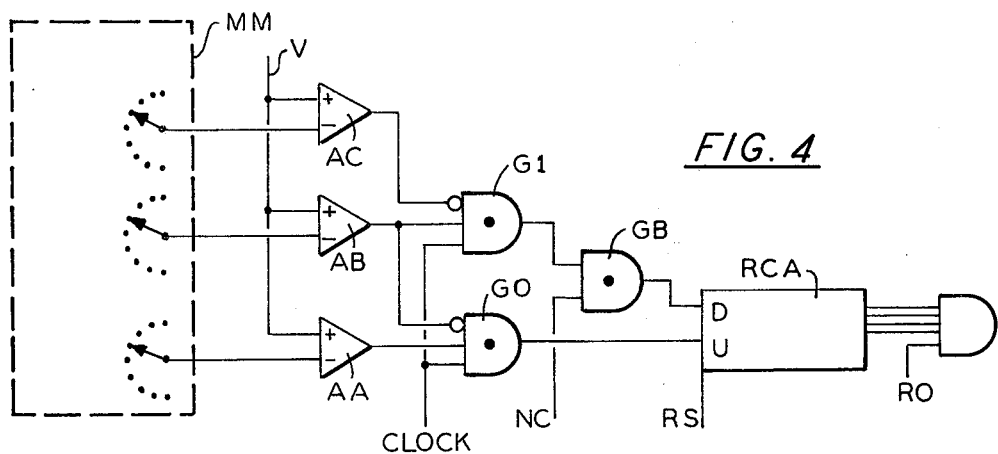
FIG. 4 is a schematic diagram illustrating a form of the invention in which the data values are provided each after a respective scanning field.

In the form of the invention illustrated in FIG. 1 a pattern (not shown) such as a leukocyte carried on glass slide 10 and illuminated by illuminator 11 is viewed through microscope 12 by television camera 13, providing a video signal which is amplified by amplifier 14 and applied through electronic switch ES1 to a bank of comparator amplifiers as the pattern is scanned during a scanning field. While the video signal V in FIG. 1 is arranged to vary in accordance with the transparency or optical density of the pattern, other optical arrangements may be used to provide a video signal which varies in accordance with pattern reflectance. Known forms of simple control circuitry which cause camera 13 (or an equivalent flying spot scanner, Nipkow disk scanner or the like) to scan the pattern with a scanning raster for one scanning field and to close switch ES1 to apply the video signal to the bank of comparator amplifiers, are not shown in FIG. 1 for sake of convenience and to avoid obscuring the present invention. The number of comparator amplifiers which one may use depends upon the number of different ranges of light-remissive levels one wishes to detect and will vary in different applications. In FIG. 1 thirty-two comparator amplifiers A0 through A31 are assumed to be used, only the first three and the last three being shown. Each comparator amplifier is also connected to receive a respective reference voltage from means shown as comprising voltage divider VD. The video signal V is shown applied to the non-inverting input terminal of each comparator amplifier, and the reference voltages are applied to the respective inverting input terminals, although it will be recognized that a converse arrangement may be used with appropriate polarity inversions. The voltages applied to the end taps of the voltage divider are arranged to equal or exceed the peak positive and negative excursions of the video signal V which occur during the scanning of the class of patterns to be analyzed.

During a scanning field, whenever video signal V lies between voltage levels $e_0$ and $e_1$ which define a first range $r_0$ of light-remissive levels, the output of amplifier A0 will be positive, while the outputs of amplifiers A1 through A31 all will be negative, which will result in gate G0 being enabled, and gates G1 through G31 all will be disabled. Whenever video signal V lies between voltage levels $e_2$ and $e_3$ which define a second range $r_1$ of light-remissive levels, the outputs of both amplifiers A0 and A1 will be positive, but the positive output of amplifier A1 disables gate G1. When the video signal lies between other pairs of reference voltages defining other ranges $r_2$, $r_3$, etc., of light-remissive levels, different ones of gates G3 through G31 will be enabled. Whenever a given one of gates G0 through G31 is enabled, it provides output clock pulses on its output line, the output of clock pulse oscillator 15 being applied as one input to each of the gates. Such an arrangement for enabling a given gate to provide output clock pulses whenever the video signal level lies between a respective pair of reference voltages defining a respective range of light-remissive levels is shown in prior U.S. Pat. No. 3,705,383. However, in the system of the prior patent the clock pulses from the bank of gates are routed to individual respective digital counters. In FIG. 1 the output of gate G0 is shown routed to an individual digital counter C0, but each of the further counters RC1 through RC31 is shown receiving pulses from a respective pair of gates. Each of counters RC1 through RC31 is shown as comprising a reversible counter having an "up" input line and a "down" input line. Thus as the video signal level lies between reference voltages $e_0$ and $e_1$ defining range $r_0$, clock pulses from gate G0 increment counter C0 and simultaneously decrement counter RC1, when the video signal level lies between reference voltages $e_1$ and $e_2$ defining range $r_1$, clock pulses from gate G1 increment counter RC1 and decrement counter RC2, etc. At the end of a scanning field then, the count in counter C0 will represent the amount of area of the scanned pattern falling within range $R_0$ of light-remissive levels defined by voltages $e_0$ and $e_1$, but the count in counter RC1 will represent the difference between the area of the pattern falling in range $r_1$ and the area falling in range $r_0$, and similarly, each of counters RC2 through RC31 will provide a count indicating the difference between a respective pair of pattern areas falling within a respective pair of light-remissive ranges. If one designates the amount of pattern area falling within range $r_0$ as $A_0$, that falling within range $r_1$ as $A_1$, etc., it will be seen that the counts in counters C0, RC1, RC2, RC3, etc., will be proportional to $A_0$, $(A_1 - A_0)$, $(A_2 - A_1)$, $(A_3 - A_2)$, etc. Inasmuch as each of the reversible counters now tallies the difference between quantities which must be registered in their totalities in the system of the prior patent, it will become evident that counters RC1 through RC31 will require less counting capacity for a given application and may incorporate fewer counting stages, affording significant savings. Inasmuch as the two input lines of each reversible counter each tally counts from a different range, and because the video signal can only lie within one range at a given time, i.e. the ranges do not overlap, it will be apparent that none of the reversible counters will encounter a condition wherein pulses attempt to drive it in opposite directions at the same time.

While counters RC1 to RC31 provide different output data values than those derived by the system of the prior patent, it should be recognized that the incremental data values provided in FIG. 1 may be readily converted to the absolute values of the prior art is desired. For example, the data values from counters C0 and RC1 may be simply added to provide the value $A_1$ which the prior art system would provide. From comparing FIG. 2b or 2c with FIG. 2a, it will be apparent that all of the numerical values are larger in the prior art system, requiring that they be represented by more bits. In FIG. 1, after the field has been scanned and counts are registered in counters C0 and RC1 to RC31, a conventional multiplexing circuit MC may read out the counter contents for transmission to an analyzing device. Having fewer bits, it will be apparent that the contents of each counter may be read out on fewer lines if read out in parallel, or read out in less time if the contents are read out serially, than with the prior art system. The data values are shown transmitted from multiplexer MC to a remote storage or processing device DC, such as a digital computer. The transmission link may comprise a telephone line or lines, or even a conventional radio link. If the counter contents are read out and transmitted in the order C0, RC1, RC2, etc., and if each successive data value is merely added to the prior values by routing them to the computer accumulator, it will be apparent that the accumulator values will be $A_0$, $A_1$, $A_2$, etc., i.e. the accumulator will provide exactly the same values as the prior art system. The reversible counters of FIG. 1 may take a variety of known forms, and for example, may register negative counts in complement form.

FIG. 2a is a histogram showing the counts registered in the counters when a theoretical pattern has been scanned by the prior art system, while FIG. 2b is a histogram showing the comparable counts registered in the system of FIG. 1. In each of these Figures the area between the base line and the histogram values represents the minimum counter capacity required, and even though some excess count capacity is needed with either system, it will be seen that far less capacity will tend to be required in FIG. 2b for the system of FIG. 1. Theoretically, one may devise hypothetical types of patterns wherein the system of FIG. 1 would require as much counter capacity as the prior art system. For example, the number of counts in any of the reversible counters of FIG. 1 will tend to be large, if, in the pattern, there is a great difference between the amount of pattern area falling within one range of light-remissive levels and the amount of pattern area falling within an adjacent range of levels. However, upon reflection it will be appreciated that large classes of natural patterns, such as biological samples, tend to vary gradually rather than in sharp step changes. One may also note that the maximum count capacity required in the reversible counters of FIG. 1 theoretically may not be guaranteed by noting the final count registered by the counter, since theoretically, a pattern could be devised which would require the reversible counter to count in one direction perhaps to a large value during a first portion of the scanning field, and then count in the other direction down to a low or zero value during the remainder of the field. However, it will be apparent that if a reasonable number of ranges are defined, natural patterns such as leukocytes and other biological samples do not tend to vary in such a manner. Furthermore, it is important to note that as one expands the system to detect a very large number (e.g. 255) of light-remissive ranges, by narrowing some or all of the ranges, the prior art system counting capacity cannot be diminished, while the savings afforded by use of the arrangement of FIG. 1 becomes even more evident, since as one provides a larger number of ranges and thus successively narrows each light-remissive range, the probability that adjacent ranges will embrace approximately equal pattern areas will be seen to increase, and if adjacent ranges embrace approximately equal pattern areas, only modest counting capacity is required in a counter which registers the difference between those areas.

The histograms of FIGS. 2a to 2c roughly resemble those which might be obtained from scanning a leukocyte, and in FIG. 2a the large peak near the left side may be deemed to correspond to the large amount of background or "completely transparent" area which would be sensed if the leukocyte does not fill a large percentage of the field when scanning occurs with the system of the prior patent. FIG. 2b illustrates the histogram which would be provided by the system of FIG. 1 for a scanning of the same pattern under the same conditions if more positive video levels represent more transparent areas, so that counter CO registers most dense areas and each reversible counter registers a count for a given range less that for the adjacent more dense range. If, on the other hand, the sense of the video signal is reversed, so that more positive video levels represent more dense areas, counter CO would register least dense or most transparent areas and each reversible counter will register the count for a given range less that for the adjacent more transparent range, providing data values of the nature shown by the histogram of FIG. 2c, from which it will be readily apparent that, as in FIG. 2b, much less counting capacity is needed compared to FIG. 2a representing the prior art system. It should be noted that the counter CO value appears at the right side of FIG. 2b but at the left side of FIG. 2c. By comparing the histograms of FIGS. 2b and 2c, one many readily deduce that they are identical in shape, but with one turned end for end and inverted relative to the other, and with a vertical displacement of one from the other in accordance with the difference between the two counter CO values assumed.

In many applications of the invention the voltages $e_0$ and $e_{32}$ applied to the opposite ends of voltage divider VD will comprise predetermined voltages known to exceed the peak positive and negative excursions which will occur in the video signal level during the scanning of the class of pattern being analyzed. In other applications of the invention one or both of voltages $e_0$ and $e_{32}$ may be determined by pre-scanning the pattern during a first field, detecting the one or both maximum excursions of the video signal by means of one or two peak detectors, and then using the peak detectors during a following scanning field to provide voltages $e_0$ and/or $e_{32}$. Such an arrangement has the advantage of distributing the light-remissive ranges efficiently over the entire video range, thereby obviating conditions under which one or more of the comparator-gate-counter channels may be inactive and hence wasted.

The invention is readily applicable to systems which utilize analog integrators in lieu of digital pulse counters as the accumulator means, as will become readily apparent from FIG. 3. In FIG. 3 gates G0 and G1 are assumed to operate as in FIG. 1, although no clock pulse input in necessary, so that two-input gates may be substituted, if desired. Gate G0 closes electronic switch S0 to apply a fixed positive voltage to integrator I0 while the video level lies within range $r_o$, and closes switch SOB to apply a fixed negative voltage to integrator I1. When the video level lies within range $r_1$ gate G1 closes switch S1 to apply the positive input to integrator I1, and closes switch S1B to apply the negative voltage input to integrator I2 (not shown). Further gates are connected to operate further integrators in similar fashion. It will be readily seen that at the end of the scanning field integrator I0 will provide an output voltage proportional to the count of counter CO of FIG. 1, that integrator I1 will provide an output voltage proportional to the count of counter RC1 of FIG. 1, and so forth. The system of FIG. 3 utilizes the same number of integrators as the prior art system, but the operating range of each integrator represents a smaller numerical value, thereby allowing each analog value to be digitized into fewer bits without loss of resolution in arrangements where the analog values are converted to digital values by an analog-to-digital converter (not shown) prior to analysis, thereby saving conversion time and/or equipment.

The present invention is also readily applicable to systems wherein much of the comparator and gate and/or counter circuits are timeshared among different light-remissive levels as plural successive scanning fields are used to examine the pattern. In FIG. 4 a multiplexing means MM shown for sake of simplicity as a group of mechanical selector switches is assumed to apply successive trios of reference voltages to comparator amplifiers AA, AB, AC as successive fields are scanned, each trio defining a pair of light-remissive ranges. During first and second fields reference voltages $e_0$, $e_1$ and $e_2$ are applied, to define ranges $r_0$ and $r_1$, although voltage $e_2$ need not be applied during the first field. During the first field gate GB is held disabled by line NC so that counter RCA operates unidirectionally and tallies an up count $A_0$ for range $r_0$, in the manner of counter CO of FIG. 1. At the end of each scanning field line R0 is briefly raised to gate the counter contents out to a suitable storage or processing device (not shown), and then line RS is briefly raised to reset counter RCA to zero. During the second field the multiplexer means MM applies reference voltages $e_0$, $e_1$ and $e_2$ to amplifiers AA, AB and AC. During the second and following fields gate GB is enabled so that counter RCA tallies the difference between the output of gate G0 and that of gate G1. Thus during the second field counter RCA will tally the quantity $A_0 - A_1$. During the third field reference voltages $e_1$, $e_2$ and $e_3$ are applied to the comparator amplifiers and hence the counter tallies the quantity $A_1 - A_2$, during the fourth field reference voltages $e_2$, $e_3$ and $e_4$ are applied and the counter tallies $A_2 - A_3$, and so forth.

Figure 4A:
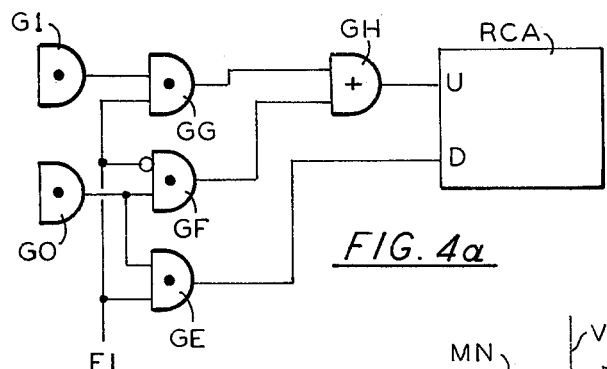
FIG. 4a is a schematic diagram illustrating mofidications which may be made to the system of FIG. 4.

The system of FIG. 4 may be modified as indicated in FIG. 4a. Line F1 is lowered during first field, disabling gates GE and GG and enabling gate GF, so that counter RCA tallies the CO output of $A_0$. Line F1 is raised during all successive fields, so that the counter tallies the G1 output less the G0 output, and hence the second and ensuing fields tally the quantities $A_1 - A_0$, $A_2 - A_1$, $A_3 - A_2$, etc.

Figure 5:
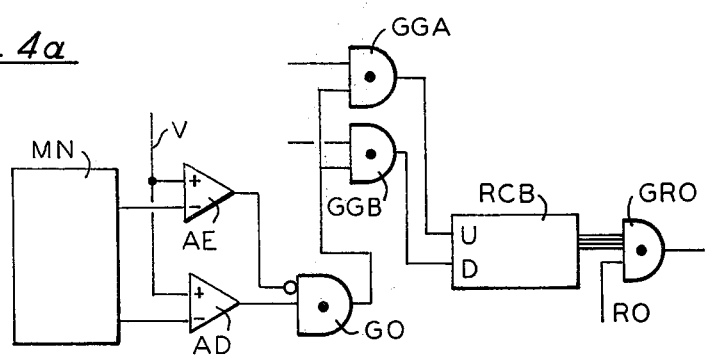
FIG. 5 is a schematic diagram illustrating a form of the invention wherein the incremental data values are provided in accordance with an alternative method.

In a different arrangement partially illustrated in FIG. 5 successive pairs of reference voltages are applied to comparator amplifiers AD and AE by a multiplexer means MN during successive scanning fields. During the first field gate GGA is enabled to make a positive absolute count for the range $r_0$ defined by the pair of reference voltages. Gate GR0 is enabled to read out the count $A_0$ at the end of the first field, but the counter is not reset. During the second field gate GGB is instead enabled, so that counter RCB counts downwardly as range $r_1$ is sensed, but since counter RCB was not reset at the end of the first field, the count at the end of the second field manifestly will be proportional to $(A_0 - A_1)$. Gates GGA and GGB are enabled during alternate successive fields, thereby providing count values $A_0$, $(A_0 - A_1)$, $(A_0 - A_1 + A_2)$, $(A_0 - A_1 + A_2 - A_3)$, $(A_0 - A_1 + A_2 - A_3 + A_4)$, etc. A histogram of the count values which are provided by such a procedure for the same pattern assumed for FIGS. 2a–2c is shown in FIG. 2d, from which it may be seen that more counting capacity would be required for the system of FIG. 5 than for the systems of FIGS. 1, 4 and 4a portrayed by the histograms of FIGS. 2b and 2c, but less than that of a prior art system using a counter to register the count values shown in the histogram of FIG. 2a.

Figure 6:
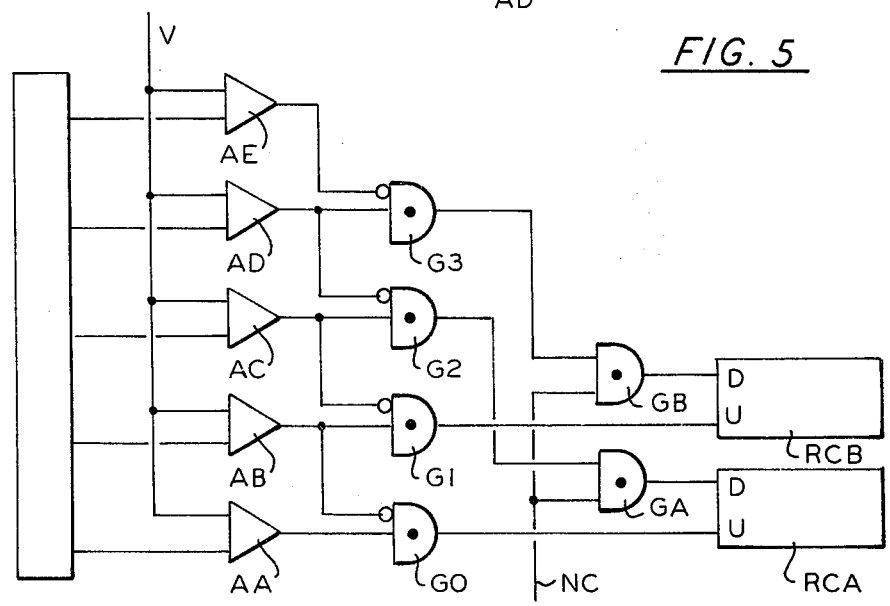
FIG. 6 is a schematic diagram illustrating a further form of the invention.

In an alternative system illustrated in FIG. 6 two reversible counters register counts during each scanning field, and each counter tallies a count of the difference of the areas of the pattern falling with two non-adjacent ranges of light-remissivity. During the first scanning field line NC is lowered so that counters RCA and RCB operate unidirectionally. Reference voltages $e_0$ through $e_4$ are applied to amplifiers AA through AE, respectively, during the first and second fields. During the first field counter RCA tallies quantity $A_0$ and counter RCB tallies quantity $A_1$. During the second field and following fields gates GA and GB are both enabled. During the second field then, counter RCA tallies quantity $A_0 - A_2$ and counter RCB tallies the quantity $A_1 - A_3$. During the third field reference voltages $e_2$ through $e_6$ are applied to amplifiers AA to AE, respectively, so that counter RCA tallies the quantity $(A_2 - A_4)$ and counter RCB tallies the quantity $(A_3 - A_5)$. During the fourth field reference voltages $e_4$ through $e_8$ are applied to the amplifiers, so that the counters tally the quantities $(A_4 - A_6)$ and $(A_5 - A_7)$, and so forth for further scanning fields. It should be recognized that the principles of FIG. 6 can be expanded so as to use three or more counters during each scanning field. For example, if three counters are designated RCA, RCB and RCC, they may be arranged to tally counts in the following manner during successive scanning fields:

| Field | RCA | RCB | RCC |
| --- | --- | --- | --- |
| 1st | $A_0$ | $A_1$ | $A_2$ |
| 2nd | $A_0 - A_3$ | $A_1 - A_4$ | $A_2 - A_5$ |
| 3rd | $A_3 - A_6$ | $A_4 - A_7$ | $A_5 - A_8$ |
| 4th | $A_6 - A_9$ | $A_7 - A_{10}$ | $A_8 - A_{11}$ |

If the count values from each counter are successively transmitted to a remote computer accumulator to subtract each value from the previous contents of the accumulator, it will be seen that the same values as those provided by the prior art will be registered in the computer accumulator, but that smaller counters can be used in the scanner-counter equipment and lesser values need be transmitted to the computer.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In apparatus for classifying a pattern comprised of elemental areas situated fixedly with respect to each other within a scanning field, said elemental areas having three or more different light-remissive levels, the combination of scanning means for optically scanning said field and said elemental areas of said pattern with a plurality of successive scan lines to derive an electrical waveform having a parameter which varies in accordance with the light-remissive level of the elemental area being scanned at a given instant; signal processor means responsive to said electrical waveform for providing three or more groups of further signals, the signals of each group of further signals being provided during the times that said parameter of said electrical waveform lies between a respective pair of values defining a respective range of light-remissive levels, whereby the time integral of each of said groups of further signals is commensurate with the total amount of area within said scanning field falling within a respective one of said ranges of light-remissive levels; and time-integrating accumulator means for separately accumulating the signals of predetermined combinations of said groups of further signals to provide three or more stored data signals defining values of a function characteristic of said pattern.

2. The combination according to claim 1 wherein at least one of said predetermined combinations of said groups of further signals comprises a pair of groups of said further signals provided whenever said parameter of said waveform lies between first and second values.

3. The combination according to claim 1 including means for processing said stored data signals to classify said pattern.

4. The combination according to claim 1 wherein the further signals of a first and a second of said groups are connected to drive said accumulator means in mutually-opposite senses, whereby one of said stored data signals provided by said accumulator means is commensurate with the difference between the total area within said scanning field which lies within a first of said ranges of light-remissive levels and the total area within said scanning field which lies within a second of said ranges of light-remissive levels.

5. The combination according to claim 1 wherein the further signals of a first and a second of said groups are connected to drive said accumulator means in mutually-opposite senses, whereby one of said stored data signals provided by said accumulator means is commensurate with the sum of the total area within said scanning field which lies within a first of said ranges of light-remissive levels and the total area within said scanning field which lies within a second of said ranges of light-remissive levels less the total area within said scanning field which lies within a third of said ranges of light-remissive levels.

6. The combination according to claim 1 including means for combining predetermined groups of said stored data signals to provide further data signals defining values of a function characteristic of said pattern.

7. The combination according to claim 1 wherein at least one pair of said ranges are substantially contiguous and non-overlapping.

8. The combination according to claim 1 wherein said accumulator means is operative to separately accumulate the signals of at least one of said groups to provide a further stored data signal.

9. The combination according to claim 1 wherein said accumulator means comprises a plurality of reversible pulse counters.

10. The combination according to claim 1 wherein said accumulator means comprises a plurality of analog integrators.

11. In a process for classifying a pattern comprised of elemental areas situated within a scanning field and having three or more different light remissive levels, the steps of optically scanning said field to derive a waveform having a parameter which varies in accordance with the light-remissive level of the elemental area being scanned at a given instant; processing said waveform to provide three or more groups of further signals, the signals of each group of said further signals being provided whenever said parameter of said electrical waveform lies between a respective pair of values defining a respective range of light-remissive levels; and separately accumulating predetermined combinations of said groups to provide three or more stored data signals defining values of a function characteristic of said pattern.

12. The process according to claim 11 including the step of combining predetermined combinations of said stored data signals to provide further data signals, each of said further data signals being commensurate with the total area of said pattern falling within a respective one of said ranges of light-remissive levels.

13. The process according to claim 1 wherein said step of accumulating comprises driving an accumulator means in mutually-opposite senses with the signals of a pair of said groups of further signals to provide a stored data signal commensurate with the difference between the areas of said scanning field falling within a first and a second of said ranges.

* * * * *